United States Patent Office 3,772,393
Patented Nov. 13, 1973

3,772,393
DI(HIGHER SECONDARY ALKYL)
HYDROQUINONES
Byron A. Hunter, Woodbridge, Conn., assignor to
Uniroyal, Inc., New York, N.Y.
No Drawing. Application July 20, 1967, Ser. No. 654,713, now Patent No. 3,424,821, which is a continuation-in-part of application Ser. No. 506,860, Nov. 8, 1965, now Patent No. 3,467,735. Divided and this application Mar. 26, 1968, Ser. No. 715,970
Int. Cl. C07c 39/08
U.S. Cl. 260—625                            2 Claims

ABSTRACT OF THE DISCLOSURE

New di(secondary alkyl) hydroquinones in which the alkyl groups contain 12 or more carbon atoms are prepared by reacting $C_{12}$ and higher alpha-olefins with hydroquinone. Modified preparations are made using styrene, alpha-methyl styrene or terpenes in addition to alpha-olefin. The products are useful as antioxidants, especially for polymers (rubbers or plastics) or vegetable oils.

CROSS REFERENCE TO RELATED APPLICATIONS

This application is a division of my copending application Ser. No. 654,713, filed July 20, 1967, now U.S. Pat. 3,424,821, issued Jan. 28, 1969, which is in turn a continuation-in-part of my copending application Ser. No. 506,860, filed Nov. 8, 1965, now U.S. Pat. 3,467,735, issued Sept. 16, 1969.

BACKGROUND OF THE INVENTION

(1) Field of the invention

This invention relates to certain dialkylated hydroquinones as new chemicals, as well as to a method of making dialkylated hydroquinones.

(2) Description of the prior art

Various lower alkyl-substituted hydroquinones are known as antioxidants, but they have certain disadvantages. The present invention seeks to provide improved results from such standpoints as ease and economy of preparation of the atnioxidants, desirable characteristics in the antioxidants, and enhanced effectiveness thereof.

U.S. Pat. 2,388,887, Weissberger et al., Nov. 13, 1945, discloses certain mono secondary alkyl hydroquinones, produced by the reaction of 1-olefins and hydroquinone. The present invention provides chemicals having superior antioxidant activity.

U.S. Pat. 2,296,363, Messer, Sept. 22, 1942 discloses the use of isopropenyl hydroquinone as a deterioration retarder. The present invention provides chemicals having higher molecular weight alkyl groups, which are surprisingly more effective.

U.S. Pat. 2,606,866, Amberg, Aug. 12, 1952 discloses preservation of a rubber with a terpene-modified phenol, but no chemicals comparable to the present hydroquinone-based chemicals are suggested therein.

U.S. Pat. 2,915,496 discloses stabilization of polyurethanes with alkylated phenols and diphenols but the present di(higher secondary alkyl) hydroquinones are not suggested therein.

British Pat. 1,022,719, Bayer, Mar. 16, 1966 discloses various substituted hydroquinones as stabilizers for certain polymers, but the present improved chemicals are not taught therein.

SUMMARY OF THE INVENTION

(1) New chemicals (A) New chemicals of the invention may be described as reaction products of one mole of hydroquinone with at least two moles (e.g. 2–6 moles) of an alpha-olefin containing at least 12 carbon atoms, preferably at least 14 carbon atoms. These products are believed to be in large part di(secondary alkyl) hydroquinones in which the alkyl group contains at least 12, preferably at least 14, carbon atoms.

(B) Other important products of the invention are the reaction products of hydroquinone with a mixture of alpha-olefins (e.g. 2, 3 or 4 or more alpha-olefins), said alpha-olefins containing a minimum of 12 carbon atom each; preferably at least one of said alpha-olefins has at least 14 carbon atoms; more preferably all of said alpha-olefins have at least 14 carbons atoms; the amount of alpha-olefinic material is at least two moles (e.g., 2–6 moles) per mole of hydroquinone.

(C) In another aspect the invention is directed to reaction products of hydroquinone with at least one mole of an alpha-olefin containing at least 12 carbon atoms, preferably at least 14 carbon atoms (or at least one molar equivalent of a mixture of alpha-olefins, [e.g. 2, 3 or 4 or more alpha-olefins] having at least 12 carbon atoms; preferably at least one alpha-olefin contains at least 14 carbon atoms, more preferably, all of said alpha-olefins contain at least 14 carbon atoms), and further reacted with at least 0.1 mole an unsaturated hydrocarbon selected from the group consisting of styrene, alpha-methyl styrene, and a terpene, said alpha-olefin (or mixture of alpha-olefins) and said unsaturated hydrocarbon being employed to a total of at least two moles (e.g., 2–6 moles) per mole of hydroquinone.

It is believed that the alkyl groups (or the alpha-methyl benzyl group when styrene is used, the alpha, alpha-dimethyl benzyl group when alpha-methyl styrene is used, or the terpenyl group when a terpene is used) are in the 2,5-positions.

(2) Use as stabilizers

The chemicals A, B and C as described above are useful as stabilizers, preservatives or antioxidants for organic materials (e.g., polymers, animal, mineral or vegetable oils, fish oil, fats, gasoline, etc.) normally subject to deterioration upon exposure to such adverse influences as air, heat, and light. Hydrocarbon-chain polymers, including polyolefins (e.g., polyethylene plastic, cross-linked polyethylene, polypropylene, ethylene-propylene copolymer, etc.), diene polymers (e.g., polybutadiene, polyisoprene) or copolymers of dienes with copolymerizable monoethylenically unsaturated monomers (e.g., styrene, acrylonitrile, isobutylene, vinyl pyridine, acrylic acid, acrylates, ethylene, propylene, etc., as in butadiene-styrene copolymer, butadiene-acrylonitrile copolymer, isobutylene-isoprene copolymer, ethylene-propylene-diene [e.g., dicyclopentadine, ethylidene norbornene, methylene norbornene, 1,4-hexadiene, cyclooctadiene, etc.] terpolymers, etc.) may be stabilized, using the present chemicals as antioxidants, as may such nonhydrocarbon polymers as polyurethanes, polycarbonates, polyesters, polyvinyl chloride, styrene-acrylonitrile resin ABS polymers, etc.

(3) Method of making di(secondary alkyl) hydroquinones

In another important aspect, the invention is concerned with a method of making di(secondary alkyl) hydroquinones by heating an alpha-olefin containing at least six carbon atoms, preferably at least 12 carbon atoms, more perferably at least 14 carbon atoms (or a mixture of such alpha-olefins), in the presence of a catalytic amount of (a) boron trifluoride or (b) acid activated montmorillonite clay, the alhpa-olefinic material being employed in a molecular proportion of at least two moles (e.g., 2–6 moles) per mole of hydroquinone.

DESCRIPTION OF THE PREFERRED EMBODIMENTS

The organic materials which are preserved against deterioration by use of the chemicals of the invention include those materials normally subject to adverse effects by such influences as oxygen, notably polymers (including rubbers and plastics), oils and fats, gasoline, and similar materials ordinarily degradable by oxygen, heat or light. Thus, it is well known that polymeric substances are subject to deterioration when exposed to atmospheric oxygen, particularly when the exposure is at higher temperatures. Rubbery polymers are especially susceptible to degradation in the presence of heat. This is particularly true of those rubbers which are classed as "unsaturated rubbers" and which are characterized by the presence of olefinic linkages in the polymer chains. Such rubbers are notoriously prone to oxidative attack and require the protective action of oxidation inhibitors to ensure adequate stability. Those rubbers and plastics which contain little or no unsaturation are most resistant to oxidation but these materials also are subject to oxidative degradation, particularly at elevated temperatures. Thus, polyethylene, polypropylene and polyisobutylene and rubbery polymers based on mixtures of olefins (such as ethylene-propylene rubber, for example) each require stabilizing agents for adequate protection against oxidation and heat.

An objective of the present invention is to provide protective agents which effectively inhibit the deterioration of rubbers and plastics. A further object is to provide superior oxidation inhibitors which are thoroughly dispersible and are readily incorporated into polymers and which are peculiarly adapted to commercial procedures that are employed in the manufacture of rubbers and plastics. Still other objectives are to provide stabilizing agents for polymers which are free from the disadvantages of discoloration, toxicity, odor, volatility, insolubility and hydrolyzability which have been associated in varying degrees with the stabilizing agents that have been proposed in the prior art.

The requirements of effective stabilizing agents for polymers are manifold. Not only must the materials prevent oxidation of the polymer, they should preferably be free of the problem of color, odor, etc. mentioned above and they should lend themselves to incorporation techniques which are consistent with the practices employed in the manufacture of commercial polymers. In the production of so-called "solution polymers," for instance, the monomer (or a mixture of monomers) is polymerized in the presence of a solvent and a suitable polymerization catalyst. The polymer is initially obtained as a solution or a "cement" consisting of the polymer in the solvent. After removal of the catalyst by treatment with water or by other means the polymer is recovered by removal of the solvent. The most effective means of incorporating the stabilizer in the polymer consists of dissolving the stabilizer in a solvent (preferably the same solvent used in the polymerization) and adding the stabilizer solution to the polymer cement prior to removal of the solvent. This means, of course, that the stabilizer should be soluble in the solvent.

An alternate process for polymers is the so-called "emulsion polymerization" method wherein a monomer (or mixture of monomers) is polymerized in an aqueous emulsion system in the presence of a catalyst. When the desired degree of polymerization has been reached reaction is stopped by a "shortstop" and the polymer is separated from the resulting latex by means of coagulating agents. In this case the stabilizer is introduced into the latex prior to coagulation. This is necessary as the presence of the stabilizing agent is required to protect the polymer during the drying operation which follows the coagulation and washing of the polymer. In order to ensure effective dispersion of the stabilizer in the latex the stabilizer itself is emulsified or dispersed and introduced in this compatible form into the aqueous emulsion of the polymer. For this purpose liquid stabilizing agents are preferred as these lend themselves to simple emulsification procedures. High melting solids are less practical as these are less readily dispersed in the aqueous latex system.

I have discovered new secondary dialkyl hydroquinone compounds, namely, those in which the alkyl group has at least 12 carbon atoms, preferably at least 14 carbon atoms, which are superior stabilizers for polymers. Further, I have discovered that secondary dialkyl hydroquinone compounds in which the alkyl group has at least 12 carbon atoms, preferably at least 14 carbon atoms, exhibit unique and important advantages over previously described alkyl hydroquinones in which the alkyl groups are tertiary rather than secondary. That is, I have discovered that quite unexpectedly, the secondary $C_{12}$, preferably $C_{14}$ and higher, alkyl hydroquinones vary greatly in their properties from tertiary alkyl hydroquinones, and from secondary dialkyl hydroquinones in which the alkyl group contains less than 12 carbon atoms, and that these differences are reflected in the relative usefulness of these materials as stabilizers in rubbers and plastics.

Tertiary alkyl hydroquinone compounds have been known and utilized as antioxidants for some time. In particular, 2,5-ditertiary butyl hydroquinone and 2,5-ditertiary amyl hydroquinone are commercial products which have been promoted as antioxidants. Both these materials are characterized by high melting points (213–216° C. and 181–183° C., respectively) and exhibit limited solubility in hydrocarbon solvents. In contrast to these compounds the secondary $C_{12}$ and higher dialkyl hydroquinones are liquids or relatively low-melting solids which can be converted to liquids at moderately elevated temperature. Indeed, the bis(secondary higher alkylated) hydroquinones are generally obtained as liquid products or low melting solid materials which exhibit high solubility in hydrocarbon solvents as compared to the tertiary alkylated hydroquinone compounds described above. By virtue of lower melting point and high solubility in hydrocarbons the secondary higher dialkyl substituted hydroquinones are more effective as stabilizers in both solution-prepared polymers and emulsion-prepared polymers than are the alkylated hydroquinones of the prior art.

The secondary $C_{12}$ and higher alkylated hydroquinones of my invention may be conveniently prepared by reacting $C_{12}$ and higher alpha-olefins (also called aliphatic olefins or "alpha-alpines") with hydroquinone in the presence of a suitable catalyst. Boron trifluoride and acid activated montmorillonite clay are valuable catalysts for the reaction. Other less effective catalysts such as sulfuric acid, aluminum chloride, zinc chloride and related "Friedel-Crafts type catalyst" may also be employed. Boron trifluoride is generally active between room temperature and 100° C. (although higher temperatures, e.g. 250° C., may be used) while with activated clay higher reaction temperatures (over 140° C., e.g. 141–250° C.) are usually used. Often, some heating is required to initiate the reaction between the $C_{12}$ and higher alpha-olefin and hydroquinone and the reaction then may proceed spontaneously and exothermically without the necessity of further heating. Generally, it will be found advantageous to subject the reaction mixture to a final period of heating to ensure maximum interaction and maximum yield of $C_{12}$ and higher alkylated products. Di(secondary alkyl) hydroquinones having at least six carbon atoms may also be made by this method.

The alpha-olefins alpha-alkenes that are useful as intermediates in the manufacture of the secondary $C_{12}$ and higher dialkyl hydroquinone compounds of my invention are available in a relatively pure state or as mixtures containing terminally unsaturated hydrocarbon molecules varying in chain length from $C_{12}$ to $C_{20}$ and higher. These hydrocarbons may contain either an odd or even number of carbon atoms. Of particular value are those alpha-olefins that are obtainable from the polymerization of ethylene and which contain so-called even-chain hydrocarbons. Blends of such olefins are separated into fractions covering specified molecular weight ranges or these may be separated into close cuts containing molecules of specified chain length. For the purposes of my invention mixtures of $C_{12}$ and higher olefins, preferably $C_{14}$ and higher, are quite satisfactory. Such mixtures produce secondary higher dialkylated hydroquinones which are more likely to remain fluid than products prepared from the purified olefins. An important property of these materials is their ability to dissolve in the hydrocarbon solvents utilized in the manufacture of "solution polymers." Additionally, the alpha-olefin alkylated hydroquinones because of their ease of liquification are easily emulsified and are effective stabilizers in emulsion polymers (as butadiene-styrene copolymer, for example). The $C_{14}$ and higher alkylated hydroquinones are high boiling products which are retained in polymer better than lower molecular weight materials, which can be lost when the polymer is subjected to conditions of high temperature—either during processing or during the service life of the polymer.

Examples of secondary dialkyl hydroquinones which are useful for the purposes of my invention are bis(alpha-methyl tridecyl) hydroquinone, bis(alpha-methyl) pentadecyl) hydroquinone, bis(alpha-methyl heptadecyl)hydroquinone, bis(alpha-methyl nonadecyl)hydroquinone, the reaction product of $C_{14}$–$C_{16}$ mixed alpa-olefins and hydroquinone, the reaction product of mixed $C_{16}$–$C_{18}$–$C_{20}$ alpha-olefins and hydroquinone, the reaction product of mixed $C_{14}$–$C_{20}$ alpha-olefins with hydroquinone, the reaction product of $C_{22}$–$C_{28}$ alpha-olefins with hydroquinone, the reaction product of mixed $C_{14}$ and higher alpha-olefins (containing either or both even and odd numbered olefinic hydrocarbons) and hydroquinone, the reaction product of $C_{14}$ and higher alpha-olefins (containing odd number of carbon atoms) and hydroquinone.

I have discovered that the preparation of secondary alkyl substituted hydroquinone materials can be advantageously modified by treatment of a $C_{12}$ or higher, preferably a $C_{14}$ or higher, alpha-olefin hydroquinone reaction mixture with another and reactive olefinic material such as styrene, alpha-methyl styrene, or a terpene. The terpenes may be defined as including the $C_{10}H_{16}$ hydrocarbons of what has been termed isoprenoid structure. The terpenes may be monocyclic, polycyclic, or acyclic. The terpenes are represented by such materials as alpha-pinene, camphene, limonene, carene, dipentene, terpenene, and the like. Mixed products of natural origin, such as turpentine (largely alpha-pinene with varying quantities of beta-pinene and other terpenes, depending upon the source) are suitable sources of the terpenyl group. Equivalent to the foregoing terpene radicals for purposes of the invention is the isobornyl radical.

The secondary higher dialkylated hydroquinone compounds of my invention are useful in the stabilization of a wide variety of polymeric substances. They are valuable adjuvants for rubbers and plastics. The following examples are given to illustrate the preparation and utility of these materials. It will be recognized that the versatile nature of the chemicals will permit their use in other polymers than those specifically mentioned and it is not intended that the invention be limited only to those polymers shown in the illustrated examples. In the examples, all quantities are expressed by weight unless otherwise indicated.

EXAMPLE I

Preparation of 2,5 bis(alpha-methyl tridecyl) hydroquinone

A mixture of 220 g. (2 moles) of hydroquinone, 784 g. (4 moles) of tetradecene-1 and 22 g. of acid activated montmorillonite catalyst (KSFO) was stirred and heated slowly (over one hour) to 180° C. and was kept between 180–190° C. for two hours. The mix was then cooled to 110° C. and filtered to remove the clay catalyst. The product was placed in a distilling apparatus and the unreacted tetradecene removed up to a pot temperature of 240° C. at 0.5 mm. pressure. A fraction consisting mostly of mono(alpha-methyl tridecyl) hydroquinone was then taken between 198–206° C. at 0.4 mm. The main fraction consisting of 2,5 bis(alpha-methyl tridecyl) hydroquinone was then obtained (492 g.) boiling between 255–263° C. at 0.4 mm. This product was then analyzed.

Calculated for 2,5 bis(alpha-methyl tridecyl) hydroquinone (percent): Carbon, 81.25; hydrogen, 12.35. Found (percent): Carbon, 81.46; hdrogen, 12.78.

EXAMPLE II

Preparation of 2,5 bis(alpha-methyl pentadecyl) hydroquinone

A mixture of 896 grams (4 moles) of hexadecene-1, 220 g. (2 moles) of hydroquinone and 22 g. of acid activated montmorillonite catalyst was stirred and heated to 130° C. The heating mantle was then removed and it was observed that the temperature continued to rise to 145° C. The reaction mixture was then allowed to stir for an additional 45 minutes, keeping the temperature between 140–145° C. The mix was then cooled to 100° C. and the catalyst and a small amount of unchanged hydroquinone was filtered off. The product was then placed in a distilling flask and heated to 240° C. under 15 mm. pressure to remove unreacted hexadecene-1 and a small amount of hydroquinone. The distillation was then continued under 0.45 mm. pressure. Some mono (alpha-methyl pentadecyl) hydroquinone was obtained at a boiling temperature of 194–206°. The main fraction (403 g.) was 2,5 bis(alpha-methyl pentadecyl) hydroquinone boiling between 256–277° C. at 0.45 mm. This was analyzed.

Calculated for 2,5 bis(alpha-methyl pentadecyl) hydroquinone (percent): Carbon, 81.72; hydrogen, 12.54. Found (percent): Carbon, 81.70; hydrogen, 12.90.

EXAMPLE III

Preparation of 2,5 bis(alpha-methyl heptadecyl) hydroquinone

A mixture of 110 grams (1 mole) of hydroquinone, 756 grams (3 moles) of octadecene-1 (50% excess) and 11 grams of acid activated montmorillonite catalyst were stirred and slowly heated (over 1 hour) to 130° C. The mix was then stirred for 3 hours longer between 130–140° C. The mix was cooled to 60° C. and filtered free of catalyst. Unreacted octadecene was distilled off (241 g.) under diminished pressure. The residual product was substantially pure 2,5 bis(alpha-methyl heptadecyl) hydroquinone.

Analysis.—Calculated (percent): Carbon, 82.09; hydrogen, 12.70. Found (percent): Carbon, 81.98; hydrogen, 12.89. Molecular weight: calculated, 614; found, 616.

EXAMPLE IV

Preparation of 2,5 bis(alpha-methyl nonadecyl) hydroquinone

A mixture of 110 g. (1.0 mole) of hydroquinone, 840 g. (3 moles) of n-eicosene-1 and 11 g. of acid activated montmorillonite clay catalyst (KSFO) was stirred and gradually heated to 190° C. The mix was stirred at 190–195° C. for two hours. The hot product was then filtered, using diatomaceous earth (Celite) as a filter medium. The oily product was placed in a distilling apparatus and the unreacted eicosene was removed (to a pot temperature of 260° C. at 1.5 mm. pressure). One hundred grams of the residue was then carefully distilled at lower pressure (0.6 mm.). After removal of 9 g. of distillate boiling between 217–230° C. (0.6 mm.), 41 g. of mono(alpha-methyl nonadecyl) hydroquinone was distilled off between 230–231° C. (0.6 mm.). An intermediate fraction (15 g.) boiling between 231–280° C. was taken and then 21 g. of 2,5 bis(alpha-methyl nonadecyl) hydroquinone was obtained boiling almost entirely at 280–281° C. (0.6 mm.). A small quantity of product (9.0 g.) remained in the flask.

EXAMPLE V

Preparation of bis($C_{22}$–$C_{28}$ alpha-olefin alkylated) hydroquinone

A mixture of 110 g. (1 mole) of hydroquinone 990 g. (2.2 moles) of mixed $C_{22}$–$C_{28}$ alpha-olefins (average molecular weight=450) and 22 g. of acid activated montmorillonite clay catalyst was stirred and heated gradually to 150° C. The heating mantle was removed; however, the temperature continued to increase to 170 C. The mix was kept between 150–160° C. for four hours. The hot reaction mixture was filtered, using diatomaceous earth (Celite) as a filter medium. No evidence of unreacted hydroquinone was observed. The product weighed 1074 g. (97% of charge). The material was placed in a distilling flask and heated under diminished pressure. 342 g. of distillate (largely unreacted olefin) was obtained between 155–205° C. (0.3 mm. pressure). Ninety-eight grams of material (mono alkylated hydroquinone material) was obtained between 205–235° C. (0.3 mm.). The residue (574 g.) consists principally of bis($C_{22}$–$C_{28}$ alpha-olefin alkylated) hydroquinones.

EXAMPLE VI

Preparation of mixed di($C_{14}$–$C_{16}$ secondary alkylated) hydroquinones

Into a 60-gallon stainless steel reactor was charged 73 lbs., 10 oz. of hydroquinone, 7 lbs., 7 oz. of acid activated montmorillonite clay catalyst and 299 lbs. of mixed $C_{14}$–$C_{16}$ alpha-olefins. The reactor was purged with nitrogen and heat was applied until the temperature reached 130° C. At this point the heat was turned off and it was noted that an exothermic reaction was occurring and the temperature continued to rise to 175° C. (total time, 3 hours). Heat was again applied and the temperature was maintained at 180° C. for two hours. The mix was then cooled to 120° C. and the batch was filtered from the catalyst. The filtered product (341 lbs.) was placed in a 60-gallon stainless steel reactor fitted with a condenser and a distillate receiver. The material was heated to 235° C. under vacuum (6.9 mm. pressure). 60 lbs. of olefin distillate was recovered. The residual product (281 lbs.) was removed from the reactor.

EXAMPLE VII

Preparation of mixed di($C_{14}$–$C_{16}$ secondary alkylated-terpenated) hydroquinones 220 g. (2 moles) of hydroquinone, 22 g. of acid activated montmorillonite catalyst and 812 g. (4 moles) of mixed $C_{14}$–$C_{16}$ alpha-olefins were stirred and heated as a slow stream of nitrogen gas was passed through the system. As the temperature reached 130° C. the heating was discontinued. However, the temperature continued to rise to 175° C. Finally, the mixture was maintained at 175–180° C. (heat on) and allowed to stir for a total reaction time of two hours. At this time 54.4 g. (⅖ mole) of steam distilled turpentine was dropped in through an addition funnel over a period of ten minutes, the temperature being maintained at 175° C. The mix was stirred for an additional thirty minutes at 175° C. and was then cooled to 120° C. and filtered free of the clay catalyst. The product was placed in a distilling apparatus and heated to 255° C. at 10 mm. pressure. Ninety-four grams of distillate (unreacted hydroquinone and olefins) was obtained. The residual oil weighed 917 grams.

EXAMPLE VIII

Preparation of mixed di($C_{14}$–$C_{16}$ secondary alkylated-styrenated) hydroquinones 550 g. (5 moles) of hydroquinone, 55 g. acid activated montmorillonite clay catalyst and 2030 g. (10 moles) of mixed $C_{14}$–$C_{16}$ alpha-olefins were slowly heated to 130° C. The heating unit was removed as the temperature rose gradually and spontaneously to 175° C. After a total of one hour stirring the heat was reapplied and the temperature was maintained near 175° C. for an additional two hours. At this point 104 g. (1 mole) of styrene was added dropwise (over 15 minutes) at 175° C. The mix was stirred an additional 30 minutes at 175° C. and was then cooled to 120° C. and the catalyst was filtered off. The product was then placed in a distilling flask and heated to 255° C. under 10 mm. pressure. 208 g. of distillate consisting of some hydroquinone and olefinic material was removed. The residue (2546 g.) represented 98.7% of the expected product.

EXAMPLE IX

Preparation of mixed di($C_{14}$–$C_{16}$ alpha-olefin secondary alkylated-alpha-methyl styrenated) hydroquinones 220 g. (2 moles) of hydroquinone, 22 g. acid activated montmorillonite clay catalyst and 812 g. (4 moles) of mixed $C_{14}$–$C_{16}$ alpha-olefins were slowly heated (over 1 hour) to 180° C. (As the temperature neared 130° C. the heating mantle was turned off and the temperature continued to rise spontaneously to near 180° C.) The mix was stirred an additional hour at 180° C. and then 47.2 g. (0.4 mole) of alpha-methyl styrene was added dropwise over 10 minutes, the temperature remaining near 180° C. The mix was stirred an additional ½ hour at 180° C. and was then cooled to 110° C. and the catalyst was filtered off. The product was transferred to a distillation apparatus and heated to 255° C. at 10 mm. pressure. 122 g. of distillate was removed [mixture of hydroquinone (small amount) and olefinic material]. The product weighed 901 grams.

EXAMPLE X

Reaction of $C_{30}$+ alpha-olefins with hydroquinone 560 grams (approximately 1 mole) of alpha-olefin pan bottoms (average chain length 40 carbons), 55 grams of hydroquinone and 11 grams of boron fluoride etherate were mixed and heated in a 2-liter flask. Over the course of two hours the temperature was increased gradually to 195° C. The mix was stirred for four hours between 195–200° C. The reaction product was cooled and diluted with 500 ml. of toluene. A small quantity (4 grams) of unreacted hydroquinone was filtered off. Anhydrous ammonia was bubbled through the filtrate to destroy the $BF_3$ catalyst and the solution was filtered once again with the aid of diatomaceous earth. After removal of the solvent by distillation the residual product was heated to 340° C. under 0.5 mm. pressure. The distillate consisted of unreacted olefins and a trace of hydroquinone. The non-volatile residue, consisting of alkylated hydroquinones in which the average alkyl groups contain 40 carbon atoms, weighed 441 grams.

EXAMPLE XI

Di(secondary higher alkyl) hydroquinones in a white natural rubber vulcanizate.

TABLE I

Masterbatch A (recipe)

| | |
|---|---|
| Natural rubber pale crepe | 98.65 |
| Zinc oxide | 10.0 |
| Lithopone | 60.0 |
| Snowflake whiting ($CaCO_3$) | 60.0 |
| Zinc laurate | 3.0 |
| Sulfur | 3.0 |
| Masterbatch B [1] | 1.5 |
| | 236.15 |

[1] Masterbatch B

| | |
|---|---|
| Natural rubber pale crepe | 90 |
| Tetramethyl thiuram monosulfide | 10 |
| | 100 |

Stabilizing agents were added to separate portions of Masterbatch A. These compositions are shown in Table II.

TABLE II

| | XI-1 | XI-2 | XI-3 | XI-4 | XI-5 | XI-6 | XI-7 | XI-8 | XI-9 |
|---|---|---|---|---|---|---|---|---|---|
| Masterbatch A | 236.15 | 236.15 | 236.15 | 236.15 | 236.15 | 236.15 | 236.15 | 236.15 | 236.15 |
| Ditertiary butyl hydroquinone | | 2.0 | | | | | | | |
| Ditertiary amyl hydroquinone | | | 2.0 | | | | | | |
| Reaction product of octadecene-1 and hydroquinone (2:1) | | | | 2.0 | | | | | |
| Reaction product of mixed $C_{16}$-$C_{20}$ alpha-olefins and hydroquinone (2:1) | | | | | 2.0 | | | | |
| Reaction product of $C_{14}$-$C_{16}$ alpha-olefins with hydroquinone (2:1) then ½ mole styrene | | | | | | 2.0 | | | |
| Reaction product of mixed $C_{14}$-$C_{16}$ alpha-olefins with hydroquinone (2:1) plus ½ mole turpentine | | | | | | | 2.0 | | |
| Reaction product of $C_{14}$-$C_{16}$ alpha-olefins with hydroquinone (2:1) | | | | | | | | 2.0 | |
| Reaction product of mixed $C_{12}$-$C_{14}$ alpha-olefins and hydroquinone (2:1) | | | | | | | | | 2.0 |
| Total | 236.15 | 238.15 | 238.15 | 238.15 | 238.15 | 238.15 | 238.15 | 238.15 | 238.15 |

The stocks were mixed and cured for 20 minutes at 274° F. The tensile properties of the vulcanizates were determined before and after aging in an air oven for 24 hours at 100° C. and also after aging for 48 hours in an oxygen bomb at 70° C. (300 lbs. p.s.i. oxygen pressure). The data are given in Table III.

TABLE III

| Stock | Tensile (unaged) | Tensile after 24 hours at 100° C. | Tensile after 48 hours at 70 C. (300 p.s.i.) |
|---|---|---|---|
| XI-1 | 2,100 | 610 | Failed |
| XI-2 | 1,850 | 790 | Failed |
| XI-3 | 2,150 | 800 | Failed |
| XI-4 | 2,200 | 1,010 | 1,200 |
| XI-5 | 2,200 | 1,060 | 1,360 |
| XI-6 | 2,100 | 900 | 920 |
| XI-7 | 2,200 | 950 | 1,240 |
| XI-8 | 2,230 | 1,000 | 1,200 |
| XI-9 | 2,300 | 950 | 1,460 |

EXAMPLE XII

Use of di(secondary higher alkylated) hydroquinones in a natural rubber black vulcanizate.

The same chemicals tested in Example XI were incorporated in a natural rubber tread stock as indicated in Table IV.

Stocks XII-1 through XII-9 were cured for 15 minutes at 320° F. and the tensile properties were determined before aging and after aging for 48 hours in an oxygen bomb (300 p.s.i. $O_2$) at 70° C. The data are shown in Table V.

TABLE V

| Stock | Tensile unaged | Tensile after 48 hours in $O_2$ (300 p.s.i.) at 70° C. |
|---|---|---|
| XII-1 | 3,300 | 1,340 |
| XII-2 | 3,390 | 1,340 |
| XII-3 | 3,300 | 1,450 |
| XII-4 | 3,380 | 1,990 |
| XII-5 | 3,170 | 2,210 |
| XII-6 | 3,200 | 2,000 |
| XII-7 | 3,300 | 1,810 |
| XII-8 | 2,890 | 2,000 |
| XII-9 | 3,230 | 2,010 |

The advantages of the chemicals of the invention are evident in the oxygen bomb aging of the vulcanizates.

EXAMPLE XIII

Polybutadiene

A number of stabilizing chemicals (1.0 part per 100 of polymer) were incorporated in a hexane solution of unstabilized polybutadiene. The solvent was removed with steam and the dried polymer subjected to heat aging in a 130° C. oven. The samples were removed and examined periodically for evidence of heat resinification (surface hardening when cool). The observations are recorded in Table VI.

The superior stabilizing action of the di(secondary higher alkyl) hydroquinone compounds in polybutadiene is clearly evident in the data in Table VI.

TABLE IV

| | XII-1 | XII-2 | XII-3 | XII-4 | XII-5 | XII-6 | XII-7 | XII-8 | XII-9 |
|---|---|---|---|---|---|---|---|---|---|
| Natural rubber smoked sheets | 100.0 | 100.0 | 100.0 | 100.0 | 100.0 | 100.0 | 100.0 | 100.0 | 100.0 |
| FEF carbon black | 40.0 | 40.0 | 40.0 | 40.0 | 40.0 | 40.0 | 40.0 | 40.0 | 40.0 |
| Zinc oxide | 5.0 | 5.0 | 5.0 | 5.0 | 5.0 | 5.0 | 5.0 | 5.0 | 5.0 |
| Stearic acid | 2.0 | 2.0 | 2.0 | 2.0 | 2.0 | 2.0 | 2.0 | 2.0 | 2.0 |
| Pine tar oil | 5.0 | 5.0 | 5.0 | 5.0 | 5.0 | 5.0 | 5.0 | 5.0 | 5.0 |
| Cyclohexyl benzothiazole sulfenamide | 0.5 | 0.5 | 0.5 | 0.5 | 0.5 | 0.5 | 0.5 | 0.5 | 0.5 |
| Sulfur | 2.5 | 2.5 | 2.5 | 2.5 | 2.5 | 2.5 | 2.5 | 2.5 | 2.5 |
| Ditertiary butyl hydroquinone | | 2.0 | | | | | | | |
| Ditertiary amyl hydroquinone | | | 2.0 | | | | | | |
| R.P. of hydroquinone and octadecene-1 (1:2) | | | | 2.0 | | | | | |
| R.P. of mixed $C_{16}$-$C_{18-20}$ alpha-olefins and hydroquinone (2:1) | | | | | 2.0 | | | | |
| R.P. of $C_{14}$-$C_{16}$ alpha-olefins with hydroquinone (2:1)+½ mole styrene | | | | | | 2.0 | | | |
| R.P. of mixed $C_{14}$-$C_{16}$ alpha-olfins with hydroquinone (2:1)+½ mole turpentine | | | | | | | 2.0 | | |
| R.P. of $C_{14}$-$C_{16}$ alpha-olefins with hydroquinone (2:1) | | | | | | | | 2.0 | |
| R.P. of mixed $C_{12}$-$C_{14}$ alpha-olefins and hydroquinone (1:2) | | | | | | | | | 2.0 |

TABLE VI

[Effect of heat (130° C.) and oxygen bomb aging (70° C., 300 p.s.i. $O_2$) on polybutadiene]

| | | Hours to resinify in— |
|---|---|---|
| Chemical | 130° C. oven | Oxygen bomb (70° C., 300 p.s.i.) |
| XII-1.... None.................................. | <8 | Bad 24 hours. |
| XII-2.... Ditertiary amyl hydroquinone.. | <8 | Slight 24 hours; bad 48 hours. |
| XII-3.... Ditertiary butyl hydroquinone.. | <8 | Do. |
| XII-4.... R.P. of hydroquinone with mixed $C_{12}$–$C_{16}$ alpha-olefins (1:2). | >48 | None at 48 hours. |
| XII-5.... R.P. of hydroquinone with mixed $C_{14}$–$C_{16}$ alpha-olefins (1:2). | >48 | Do. |
| XII-6.... R.P. of hydroquinone with mixed $C_{14}$–$C_{16}$ alpha-olefins (1:2) then ½ mole of styrene. | >48 | Do. |
| XII-7.... R.P. of hydroquinone with octadecene-1 (1:2) [principally bis (alpha-methyl heptadecyl) hydroquinone]. | >48 | Do. |
| XII-8.... R.P. of hydroquinone with mixed $C_{14}$–$C_{16}$ alpha-olefins and then ½ mole turpentine. | >48 | Do. |

EXAMPLE XIV

Ethylene-propylene rubber (A) A solution of unstabilized ethylene propylene rubber, E/P ratio 63/37 (in which a small amount (5%) of dicyclopentadiene was incorporated as a ter-monomer) in hexane was treated with a number of stabilizing chemicals (1% on the polymer) and the polymer was recovered by removing the solvent with steam. The polymers were dried by passing through a hot mill and the samples were then subjected to heat aging in a 130° C. oven. Gel determinations were made after 4 and 8 hours of heating. Samples were also removed from the oven periodically and examined for resinification. The data are given in Table VII.

TABLE VII

[Heat aging (130° C.) of ethylene-propylene rubber (Resinification and gel)]

| Chemical | Resinification time (hours) | Percent gel | | |
|---|---|---|---|---|
| | | Unaged | 4 hrs. | 8 hrs. |
| None........................................ | 24 | 4.0 | 5.9 | 52.1 |
| Ditertiary amyl hydroquinone....... | 24 | 10.1 | 7.9 | 26.0 |
| Ditertiary butyl hydroquinone...... | 24 | 6.9 | 4.9 | 39.5 |
| Bis(alpha-methyl heptyl) hydroquinone.................................. | 56 | 6.3 | 8.8 | 14.2 |
| R.P. of hydroquinone with mixed $C_{12}$–$C_{14}$–$C_{16}$ alpha-olefins (1:2).... | >72 | 4.9 | 5.7 | 10.0 |
| R.P. of hydroquinone with mixed $C_{14}$–$C_{16}$ alpha-olefins (1:2).......... | >72 | 1.2 | 5.2 | 4.7 |
| R.P. of hydroquinone with mixed $C_{14}$–$C_{16}$ alpha-olefins (2:1) and then ½ mole styrene................. | >72 | 5.9 | 4.1 | 9.0 |
| R.P. of hydroquinone with mixed $C_{14}$–$C_{16}$ alpha-olefins (1:2) and then ½ mole of turpentine......... | >72 | 6.0 | 4.9 | 8.5 |
| R.P. of $C_{16}$–$C_{18}$–$C_{20}$ alpha-olefins with hydroquinone (2:1)............ | >72 | 7.7 | 3.9 | 12.1 |

(B) Portions of unstabilized ethylene propylene rubber, E/P ratio 60/40 (in which a small amount (5%) of 1,4-hexadiene was incorporated as a ter-monomer) in benzene were treated with a benzene solution of the reaction product of hydroquinone with mixed $C_{16-20}$ alpha-olefins (1:2) sufficient to give 0.5 and 0.75 part of the stabilizer per 100 parts of the rubber. A few drops of the resulting rubber solutions were applied to a sodium chloride plate designed for use in an infrared spectrophotometer. Evaporation of the solvent deposited a thin polymer film on the salt plate. A similar film of the unstabilized rubber was made. The plates were placed in a 150° C. oven and were removed periodically and the infrared spectrum of the polymer was noted after each aging period. The time of heating required to bring about oxidation of the polymer (as revealed in the development of a carbonyl band at 5.8 microns on the infrared spectrum) is a measure of the effectiveness of the stabilizing agents. The data obtained are given in Table VIII.

TABLE VIII

Heat aging of ethylene-propylene-hexadiene-1,4-terpolymer

| Chemical: | Hours at 130° to carbonyl development |
|---|---|
| None ................................................. | 1 |
| R.P. of hydroquinone with mixed $C_{16}$–$C_{20}$ alpha-olefins (1:2) (0.5 part) ........................ | 17 |
| R.P. of hydroquinone with mixed $C_{16}$–$C_{20}$ alpha-olefins (1:2) (0.75 part) ...................... | 19 |

EXAMPLE XV

Polyisoprene

Infrared spectrophotometry was used to demonstrate the effectiveness of the chemicals of the invention as stabilizers in synthetic polyisoprene. Dilute solutions of the stabilizers (in benzene) were added in measured amount (1% of stabilizer on the polymer) to a dilute solution of the unstabilized isoprene in benzene. A few drops of the polymer solution were applied to sodium chloride plates (see Example XIV). After evaporation of the solvent the films on the salt plates were placed in the 130° C. oven and the infrared spectrums was examined after various aging periods. Also, in a separate test, steam was passed through portions of the prepared polymer solutions to remove the solvent. The residual polymer samples were allowed to dry and were then placed on a sheet of bond paper in an oven at 130° C. The time was noted for the development of an oil spot in the paper. The formation of such a spot is characteristic of polyisoprene which has undergone oxidative degradation and depolymerization. Data illustrating the effectiveness of chemicals of the invention in retarding oxidation and degradation of polyisoprene are given in Table IX.

TABLE IX

[Heat aging (130° C.) of synthetic polyisoprene]

| | Hours at 130° C. to— | |
|---|---|---|
| Chemical | Develop C=O band | Oil spot |
| None.................................................. | ⊖ | 1⊖ |
| R.P. of hydroquinone and mixed $C_{16}$–$C_{20}$ alpha-olefins (1:2)........................... | 12 | >12 |
| R.P. of hydroquinone and mixed $C_{16}$–$C_{20}$ alpha-olefins (1:2) and then ½ mole turpentine............................................. | | |

EXAMPLE XVI

Styrene-butadiene rubber (A) In a manner similar to that described in Example XV a 5% solution of unstabilized styrene-butadiene rubber (SBR 1502—Sample A) in benzene was treated with hexane solutions of stabilizing chemicals (1% on the polymer) (see Table X). Five drops of each of the resulting polymer solutions were placed on sodium chloride plates. After evaporation of the solvent, the resulting films on the salt plates were placed in a 130° C. oven and the infrared spectrum was examined after various periods of heat aging. The time was noted for the development of a definite carbonyl band at 5.8 microns. Data illustrating the antioxidant value of di(secondary alkyl) hydroquinone compounds and comparing these with other antioxidant materials are given in Table X.

(B) In a similar manner, individual portions of a benzene solution of unstabilized styrene-butadiene rubber (SBR 1502—Sample B) were treated with several 2,5-bis(alpha-methyl alkyl) hydroquinone compounds in which the alkyl groups varied from nine to seventeen carbon atoms in length. Three drops each of the resulting solutions were placed on salt plates and the solvent allowed to evaporate. Examination of the infrared spectra of the resulting films after varying period of aging in the 130° C. oven provided the data given in Table Xa. The hours required for the formation of a definite carbonyl band at 5.8 microns are shown.

A notable feature of the data given in both Tables X and Xa is the fact that the higher secondary alkyl hydroquinone compounds are unusually effective antioxidants in styrene-butadiene copolymers, being far superior to the previously described lower tertiary alkyl hydroquinone antioxidants in this application. The superiority of 2,5 bis(alpha-methyl undecyl) hydroquinone over the mono-(alpha - methyl undecyl) hydroquinone indicates the greater value of the di-substituted compounds. It is also evident in both Tables X and Xa that the dialkylated hydroquinone in which the alkyl substituents contain at least 12 carbon atoms show an advantage over those hydroquinone compounds containing less than 12 carbon atoms. This is surprising as one would normally expect that the higher molecular weight substituents would dilute the antioxidant function of the phenolic groups. It may be that the heavier substituents enhance the retention of the antioxidant during the heat aging. Regardless of any theory that might be proposed it is quite apparent that those dialkylated hydroquinone compounds in which the alkyl substituents contain fourteen or more carbon atoms are superior antioxidants in styrene-butadiene rubber.

TABLE X

Effect of heat (130° C.) on styrene-butadiene rubber (SBR 1502—Sample A)

| Chemical: | Hours to develop carbonyl band |
|---|---|
| None | 1 |
| 2,5 ditertiary butyl hydroquinone | 2 |
| 2,5 ditertiary amyl hydroquinone | 1 |
| 2,5 bis(alpha-methyl pentyl) hydroquinone | 3 |
| 2,5 bis(alpha-methyl heptyl) hydroquinone | 5 |
| Mono-(alpha-methyl undecyl) hydroquinone | 5 |
| 2,5 bis(alpha-methyl undecyl) hydroquinone | 23 |
| R.P. $C_{14}$-$C_{16}$ alpha-olefins and hydroquinone (2:1) | 27 |
| R.P. $C_{16}$-$C_{20}$ alpha-olefins and hydroquinone (2:1) | 29 |
| R.P. octadecene-1 with hydroquinone (2:1) | 31 |

TABLE Xa

Effect of heat (130° C.) on styrene-butadiene rubber (SBR 1502—Sample B)

| Chemical: | Hours to develop carbonyl band |
|---|---|
| None | 1 |
| 2,5 bis(alpha-methyl nonyl) hydroquinone | 7 |
| 2,5 bis(alpha-methyl undecyl) hydroquinone | 14 |
| 2,5 bis(alpha-methyl tridecyl) hydroquinone | 19 |
| 2,5 bis(alpha - methyl heptadecyl) hydroquinone | 22 |
| 2,5 bis(alpha - methyl heptadecyl) hydroquinone | 19 |

EXAMPLE XVII

Polypropylene

Polypropylene resin was banded on a mill at 340° F. Then 0.4 part of dilauryl thio dipropionate (DLTDP) and 0.1 part of hydroquinone type stabilizing agents were added and the milling continued for a total of 8 minutes at 340° F. The compounded resin was sheeted off and then compression molded at 340° F. into 75 mil sheets. Discs were cut from the cooled sheets and these were subjected to 300° F. oven aging. The time (in days) required for 2 out of 3 samples of each stock to crumble or craze was noted as the "break" time. The data shown in Table XI illustrate the stabilizing effectiveness of secondary alkylated hydroquinones in polypropylene:

TABLE XI

Heat aging (300° F.) of polypropylene

| Chemical: | Days to break at 300° F. |
|---|---|
| None | Less than 1 |
| 0.4 DLTDP | 11 |
| 0.4 DLTDP+0.1 ditertiary butyl hydroquinone | 18 |
| 0.4 DLTDP+0.1 R.P. of octadecene and hydroquinone (2:1) | 23 |
| 0.4 DLTDP+0.1 R.P. of mixed $C_{16}$-$C_{20}$ alpha-olefins and hydroquinone (2:1) | 24 |
| 0.4 DLTDP+0.1 R.P. of mixed $C_{12}$-$C_{16}$ alpha-olefins and hydroquinone (2:1) | 28 |

EXAMPLE XVIII

Acrylonitrile-butadiene styrene copolymer

An ABS polymer was prepared by polymerizing styrene (35 parts) and acrylonitrile (15 parts) in the presence of polybutadiene latex (5 parts of rubber) according to the procedure of U.S. Pat. 2,820,773. Sufficient latex of a styrene-acrylonitrile (72/28 by weight) copolymer was added to reduce the polybutadiene content to 20%. An emulsion of dilauryl thio di-propionate was added to provide 0.7 parts per 100 parts of ABS polymer. The polymer was flocculated with acid and the resulting coagulum washed and dried. A dispersion of the polymer in chloroform was prepared which contained 1.77% solids. To portions of this dilute dispersion was added the antioxidant materials shown in Table XII (0.3% antioxidant on the polymer). Fifteen drops of the resulting polymer dispersions were placed on salt plates. Evaporation of the solvent deposited films of polymer on the plates. The plates were then heated in a circulating air oven at 400° F. and the infrared spectrum was observed after each ten minutes of heating. Development of carbonyl bands at 5.8 and 5.9 microns was indicative of oxidative failure of the films. The times of heating required for failure of the films containing the several antioxidants are shown in Table XII.

A notable feature of these data is the superior antioxidant properties of the dialkyl hydroquinone compounds in which the alkyl groups contain fourteen or more carbon atoms.

TABLE XII

Heat aging of ABS polymer

| Chemical: | Minutes to fail at 400° F. |
|---|---|
| None | 5 |
| R.P. of hydroquinone and— | |
| Octene-1 (1:2) | 30–40 |
| Dodecene-1 (1:2) | 30–40 |
| Tetradecene-1 (1:2) | 70–80 |
| Hexadecene-1 (1:2) | 70–80 |
| Octadecene-1 (1:2) | 70–80 |
| Eicosene-1 (1:2) | 80–90 |
| Mixed $C_{22}$-$C_{28}$ olefins | 120–130 |

EXAMPLE XIX

Acrylonitrile-butadiene copolymer

A 5% polymer solution of unstabilized acrylontrile-butadiene (30/70) copolymer in benzene was prepared. To 50 gram portions of this solution was added one gram of 2.5% solutions of the stabilizing agents given in Table XIII. This corresponds to one part of stabilizing agent to 100 parts of polymer. Five drops of each of the stabilized polymer solutions were applied to individual salt plates. Warming for ten minutes in a 130° C. oven evaporated the solvent and deposited a polymer film on each salt plate. The plates were placed in a 130° C. oven. Periodically they were removed and the infrared spectra of the polymer films were observed. The time required to produce a definite carbonyl band at 5.8 microns was recorded for each stabilizing agent. The data obtained are shown in Table XIII.

These test show that the lower alkyl hydroquinone compounds are relatively ineffective as stabilizers for the acrylonitrile-butadiene polymer. The mono alkyl derivatives are less effective than the corresponding disubstituted materials. Notably, the higher dialkylated compounds where the alkyl groups contain fourteen or more carbon atoms are particularly effective antioxidants. Three commercial antioxidants (the last three materials listed on Table XIII) are less effective than the higher dialkylated hydroquinone compounds.

TABLE XIII

Effect of heat (130° C.) on acrylonitrile-butadiene copolymer

| Chemical: | Hours to develop carbonyl band |
|---|---|
| None | ½ |
| Mono tertiary butyl hydroquinone | ½ |
| 2,5 bis(tertiary butyl) hydroquinone | 1 |
| 2,5 bis(tertiary amyl) hydroquinone | 1 |
| 2,5 bis(alpha-methyl propyl) hydroquinone | 1 |
| 2,5 bis(alpha-methyl amyl) hydroquinone | 2 |
| 2,5 bis(alpha-methyl heptyl) hydroquinone | 3½ |
| 2,5 bis(alpha-methyl undecyl) hydroquinone | 15 |
| Reaction product of mixed— | |
| $C_{12}$–$C_{16}$ alpha-olefins and hydroquinone (2:1) | 18 |
| $C_{14}$–$C_{16}$ alpha-olefins and hydroquinone (2:1) | 20 |
| $C_{14}$–$C_{16}$ alpha-olefins with hydroquinone (2:1) plus ⅕ mole alpha-methyl styrene | 18 |
| $C_{14}$–$C_{16}$ alpha-olefins with hydroquinone (2:1) plus ⅕ mole styrene | 19 |
| $C_{16}$–$C_{20}$ alpha-olefins with hydroquinone (2:1) | 19 |
| Reaction product of octadecene-1 with hydroquinone (2:1) | 23 |
| 2,2' - methylene bis(4 - methyl - 6 - t butyl phenol) | 5 |
| 2,2' - methylene bis(4 - methyl - 6 - nonyl phenol) | 11 |
| 4,4'-methylene bis(2,6-di-t-butyl phenol) | 2 |

EXAMPLE XX

In order to demonstrate applicability of the chemicals of the invention as antioxidants for other oxidizable organic materials several higher alkylated hydroquinones (1% by weight) were incorporated into several vegetable oils. The oils were applied to standard infrared salt plates and the spectra observed after various periods of aging in a 130° C. circulating air oven. In this case the development of a strong hydroxyl band at 2.9 microns was observed as the oxidation of the oil set in. (The carbonyl band could not be used inasmuch as the ester function in the oils showed up as a strong carbonyl band.)

The data are shown in the Table XIV.

TABLE XIV

| Chemical | Time to oxidize at 130° C (hours) | | |
|---|---|---|---|
| | Cotton seed oil | Corn oil | Linseed oil (raw) |
| None | 1 | 1 | ½ |
| R.P. octene-1 with hydroquinone (2:1) | 5 | 2 | 1.5 |
| R.P. $C_{14}$–$C_{16}$ alpha-olefins with hydroquinone (2:1) | 9 | 5 | 7 |
| R.P. tetradecene-1 with hydroquinone (2:1) | 12 | 7 | 5 |

EXAMPLE XXI

A number of higher alkylated hydroquinone compounds were milled into an acrylonitrile-butadiene copolymer (Paracril B) (1.25 parts of stabilizer per 100 parts of polymer). Similar mixes of the polymer with two lower tertiary alkylated hydroquinones and with no added stabilizer were also prepared. Gel determinations were made on each polymer after varying periods in the 100° C. oven and also after several periods of hot milling at 330° F. Mooney viscosities were also determined on the hot-milled polymers. Data are given in Table XV. The superiority of the higher alkylated hydroquinones in preventing gel and in preventing Mooney rise is clearly evident.

TABLE XV
[Effect of alkylated hydroquinones on acrylonitrile-butadiene copolymer]

| | Heat aging at 100° C. | | | | | Hot Milling at 330° F. | | | | | |
|---|---|---|---|---|---|---|---|---|---|---|---|
| | Percent gel | | | | | Percent gel | | | Mooney viscosity | | |
| | 0 hrs. | 12 hrs. | 24 hrs. | 48 hrs. | 96 hrs. | 0 Min. | 15 Min. | 45 Min. | 0 Min. | 15 Min. | 45 Min. |
| None | Nil | 9.8 | 52.2 | 86.3 | 76.7 | 6.0 | 76.0 | 85.7 | 63 | 144 | (1) |
| 2,5-Ditertiary butyl hydroquinone | Nil | Nil | 13.4 | 35.1 | 62.8 | Nil | 1.1 | 46.9 | 65 | 63 | 84 |
| 2,5-Ditertiary amyl hydroquinone | Nil | Nil | 11.3 | 23.9 | 60.2 | Nil | 4.5 | 40.9 | 63 | 64 | 75 |
| R.P. of octadecene-1 with hydroquinone (2:1) | Nil | Nil | Nil | 3.7 | 23.9 | Nil | 1.1 | 30.6 | 59 | 59 | 60 |
| R.P. of $C_{16}$–$C_{20}$ alpha-olefins with hydroquinone (2:1) | Nil | Nil | Nil | Nil | 16.6 | Nil | Nil | 31.8 | 61 | 61 | 60 |
| R.P. of $C_{14}$–$C_{16}$ olefins plus styrene with hydroquinone (2:1/5:1) | Nil | Nil | Nil | 11.8 | 27.9 | Nil | 3.0 | 33.3 | 62 | 61 | 54 |
| R.P. of $C_{14}$–$C_{16}$ olefins plus turpentine with hydroquinone (2:1/5:1) | Nil | Nil | Nil | 6.7 | 16.1 | Nil | 2.4 | 30.9 | 60 | 58 | 58 |
| R.P. of $C_{14}$–$C_{16}$ olefins with hydroquinone (2:1) | Nil | Nil | Nil | 5.3 | 20.6 | Nil | Nil | 27.3 | 60 | 58 | 62 |
| R.P. of $C_{12}$–$C_{16}$ olefins with hydroquinone (2:1) | Nil | Nil | Nil | 3.4 | 21.2 | Nil | 5.2 | 29.2 | 62 | 61 | 62 |

1 Too hard.

EXAMPLE XXII

Natural rubber adhesive

The effectiveness of a higher alkylated hydroquinone as an antioxidant in a natural rubber adhesive is illustrated in the following:

100 parts of #1 natural rubber smoked sheet was masticated on a cold mill until the Mooney viscosity was reduced to 30 Mooney. This was then placed in a Banbury mixer and mixed with 100 parts of zinc oxide and 100 parts of thermoplastic terpene polymer tackifying resin, ball and ring softening point 70° C. (Piccolyte S–70). Portions of the composition were mixed with 1% of several stabilizing agents (based on rubber hydrocarbon) and samples were heated in a 130° C. oven. The time noted for the material to lose its tackiness and adhesive quality in the presence of the various stabilizers is shown in Table XVI.

TABLE XVI

| Chemical: | Hours to lose tackiness |
|---|---|
| None | 4 |
| 2,5-ditertiary butyl hydroquinone | 8 |
| 2,2'-methylenebis(4-methyl-6-t-butyl phenol) | 8 |
| R.P. of $C_{16}$–$C_{20}$ alpha-olefins and hydroquinone (2:1) | (¹) |

¹ Still tacky at 12 hours.

EXAMPLE XXIII

Cross linked polyethylene

Polyethylene compositions were prepared by combining the ingredients of the following recipes in a Banbury mixer.

| | A | B |
|---|---|---|
| Polyethylene DYNA-1 | 100 | 100 |
| Carbon black (Thermax) | 25 | 25 |
| Dicumyl peroxide (Dicup R) | 2.7 | 2.7 |
| Reaction product of $C_{14}$–$C_{16}$ alpha-olefins and hydroquinone (2:1) | | 0.5 |

Stocks A and B were press cured for 10 minutes at 320° F. The tensile and elongation values were determined before and after aging for 7 and 14 days at 150° C. The data are given in Table XVII.

TABLE XVII

| | A | B |
|---|---|---|
| Unaged: | | |
| Tensile (p.s.i.) | 2,610 | 2,390 |
| Elongation (percent) | 450 | 480 |
| Aged 7 days at 150° C.: | | |
| Tensile (p.s.i.) | 1,190 | 1,970 |
| Elongation (percent) | 10 | 280 |
| Aged 14 days at 150° C.: | | |
| Tensile (p.s.i.) | Failed | 1,360 |
| Elongation (percent) | Failed | 200 |

Having thus described my invention, what I claim and desire to protect by Letters Patent is:

1. A 2,5-di(secondary alkyl) hydroquinone in which both of the alkyl groups contain at least 14 but not more than an average of 40 carbon atoms.

2. 2,5-di(secondary alkyl) hydroquinones in which the secondary alkyl groups are both long chain alkyl groups consisting entirely of mixed $C_{14}$–$C_{16}$ secondary alkyl groups.

References Cited

UNITED STATES PATENTS

| | | | |
|---|---|---|---|
| 2,360,290 | 10/1944 | Vittum | 260—619 |
| 2,455,746 | 12/1948 | Erickson | 260—625 |
| 2,107,307 | 2/1938 | Rawlins et al. | 260—154 |
| 2,435,087 | 1/1948 | Luten et al | 260—621 |
| 2,567,848 | 9/1951 | Kooyman | 260—625 |
| 2,732,300 | 1/1956 | Thritle et al. | 260—625 |
| 3,000,964 | 9/1961 | Milligan | 260—624 |
| 3,424,821 | 1/1969 | Hunter | 260—880 |

BERNARD HELFIN, Primary Examiner

W. B. LONE, Assistant Examiner

U.S. Cl. X.R.

260—619 D, 624 C